April 20, 1965

R. S. ROOT 3,179,217

SEALED OIL PULL CLUTCH WITH BRAKE

Filed Dec. 6, 1962

INVENTOR
ROBERT S. ROOT

BY

ATTORNEY

United States Patent Office 3,179,217
Patented Apr. 20, 1965

3,179,217
SEALED OIL PULL CLUTCH WITH BRAKE
Robert S. Root, Syracuse, N.Y., assignor to Lipe-Rollway Corporation, Syracuse, N.Y., a corporation of New York
Filed Dec. 6, 1962, Ser. No. 242,879
4 Claims. (Cl. 192—13)

This invention relates to a friction clutch and more particularly to a heavy duty sealed oil pull clutch and brake assembly.

Clutches used in land vehicle machines have suffered primarily from a short life. This is essentially due to excessive wear on the clutch friction surfaces. It has been proposed to reduce wear by running the clutch friction surfaces in fluid. The cooling fluid, however, has a tendency to create a fluid drag resistance between the friction surfaces on the driven and driving members of the clutch, when it is desired to disengage the clutch. Furthermore, the use of fluids generally requires the application or use of oversized clutches which possibly cannot be used in land vehicles without substantial redesign of the entire vehicle to permit installation of the oversized clutch; in addition such oversized clutches cannot, of course, be substituted directly for dry friction clutches in the land vehicles presently in use. Manufacturers of land vehicles, such as trucks, busses, special service equipment and tractors, are concerned with many other problems in the construction of these vehicles; because of the high cost of design and retooling, these manufacturers may be unable to economically build improved oversized clutches into the vehicles.

It is therefore an object of the present invention to provide a heavy duty clutch with a greatly increased life.

It is another object to provide an improved clutch of standard size which will permit direct insertion into previously constructed land vehicles and which can be inserted into new vehicles without the necessity of redesigning the vehicles to provide increased space for the improved clutch.

It is another object to provide a sealed oil pull-clutch and brake assembly.

It is yet another object to provide a clutch assembly which is economical and simple to build and install, without need for pipes, hoses, pumps or oil sealing complexes.

These and other objects and the nature and advantages of the present invention will become apparent from the following description taken in conjunction with the accompanying drawings, wherein.

Figures 1, 2:
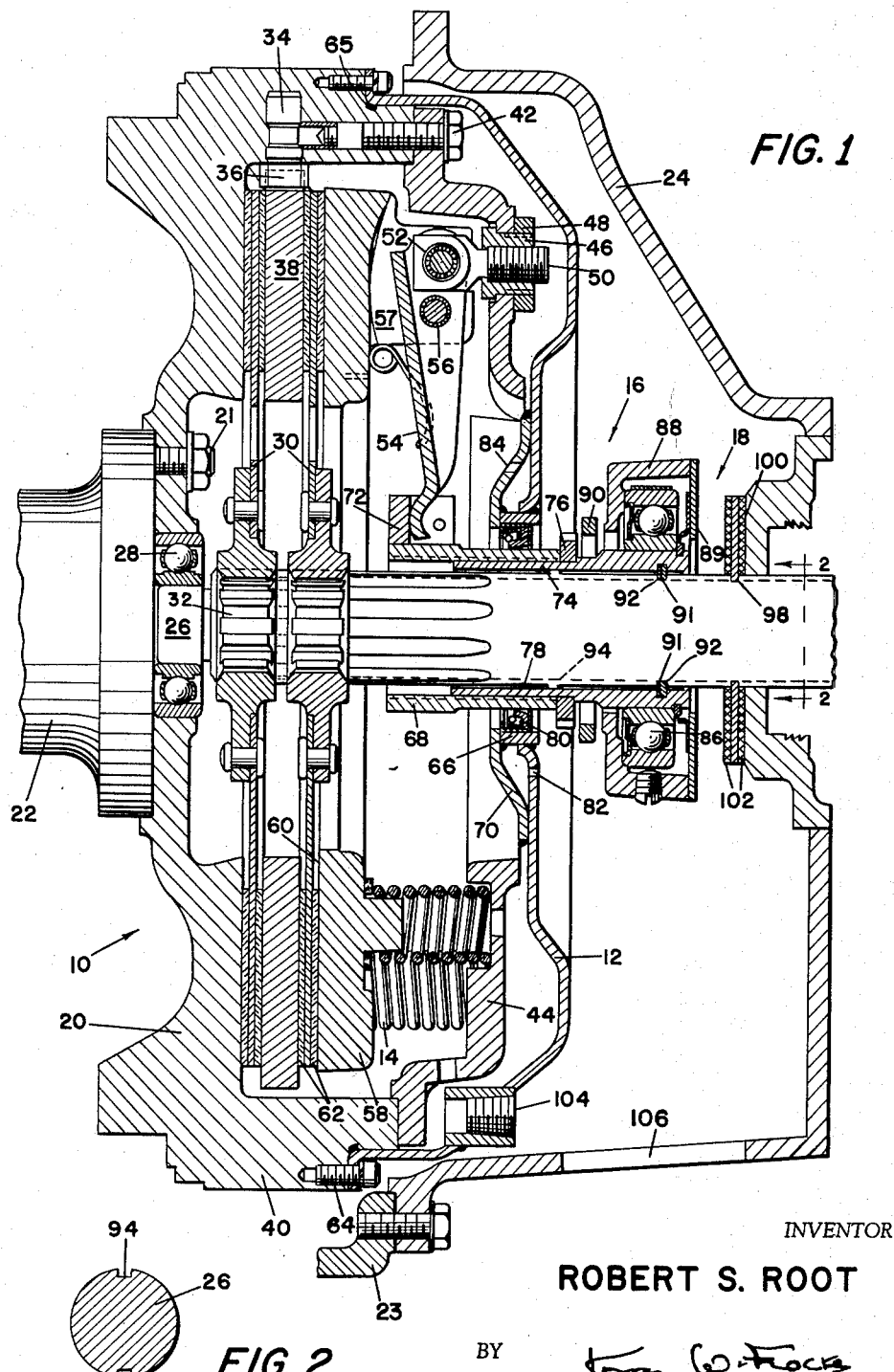
FIG. 1 is a vertical sectional view of a clutch embodying the invention.
FIG. 2 is a vertical section through shaft 26, taken along line 2—2 of FIG. 1 with parts removed and looking in the direction of the arrows.

Broadly the clutch assembly of the present invention comprises a clutch generally shown at 10, an oil tight housing 12 about the clutch 10, spring members 14 which urge the clutch friction members into driving relationship, pull mechanism 16 which disengages the clutch friction member by moving away from the clutch, and brake member 18 which may be engaged by pull mechanism 16 with additional movement after disengaging the clutch. The pull mechanism 16 includes an operating member (not shown) in the form of a yoke which engages member 88, or portions associated therewith so that axial movement with respect to shaft 26 may be effected. The brake member 18 includes the braking surface elements 102 associated with the member 98, which braking surface elements are adapted to be pressed against the surface 100 when element 89 is forced to the right under pressure thus creating braking (viewing the structure as illustrated in FIG. 1).

In order to overcome short clutch life it is necessary to reduce wear and heat in the clutch friction members. In the present invention this is accomplished by bathing the clutch within an oil bath. In order to retain the oil bath, the housing 12 together with flywheel 20 is provided to form an oil-tight compartment. The clutch is disengaged by mechanically operating the pull mechanism 16. At this point, however, the oil provides a fluid drag resistance between the driven and driving members. It is desirable at times e.g., when downshifting or when shifting into first gear, in the absence of complex and expensive syncro-mesh transmission gears, to overcome this fluid drag resistance to prevent transmission gear clashing when shifting. This is advantageously accomplished by pulling the mechanism 16 an additional distance to engage brake mechanism 18 and reduce the rotational rate of, or stop entirely, the driven shaft to permit the desired shifting.

In greater detail, the assembly includes a driving member comprising flywheel 20 attached to driveshaft 22 with bolts 21. The flywheel and driving shaft are surrounded and inclosed by a flywheel housing 23 and transmission housing 24. The driving member has the driven shaft 26 journalled in the bearing 28 in the center of the flywheel. The driven shaft 26 has a pair of clutch friction discs 30 slidingly splined thereto, as at 32, to allow the clutch discs to move axially on the shaft. The driving member (flywheel 20) carries a plurality of pins 34 engaging axial slots 36 which are contained in a secondary driving plate 38 which is adapted to move axially on the pins 34.

Affixed to annular flange 40 of the driving member (flywheel 20), as by fasteners 42, is a clutch cover plate 44. The clutch cover plate has a plurality of circumferentially spaced sleeves 46 mounted in the clutch cover plate by means of nuts 48. Received in the sleeves 46 are pivot pins 50 which are pivotally connected, as at 52, to a plurality of throw-out levers 54. Intermediate pivotal connection 52 and the inner end of the throwout lever 54 is a second pivotal connection 56 attached to a driving lug 57, a part of pressure plate 58. The pressure plate has an inner friction face 60 which engages the outer friction face of one of the friction discs 30. The pressure plate is normally biased into engagement with the outer friction disc by a plurality of compression springs 14 circumferentially spaced about the periphery of the pressure plate. As noted above these springs normally act to force the pressure plate into engagement with the outer friction disc 30 which carries friction faces 62 on both of its surfaces. The inner surface of the outer friction plate in turn engages the driving plate 38 which engages the outer friction surface 62 on the inner friction disc which in turn engages the driving surface on the flywheel, thus providing a frictional driving engagement between the driving member and the driven shaft by means of the friction discs, pressure plate and driving plate under compressed load.

The oil tight housing 12 is secured at its periphery to the flange 40 of the flywheel as by screws 64, which provide an oil tight joint between the housing 12 and the flywheel together with O ring 65. A sleeve 66 is fixedly secured in the central portion of the housing 12 as by being welded thereto. The sleeve 66 encircles throw-out collar 68 of the pull mechanism 16. Near its inner portion oil tight housing 12 is provided with a secondary wall portion 70 which projects from oil tight housing wall 12 to sleeve 66 to form a triangular shaped annular opening between walls 12 and 70. A cooling and lubricating fluid such as oil is normally retained within housing 12 to bathe the friction elements 62 and dissipate heat therefrom to and through housing 12.

Elements 72, U-shaped stampings, are welded to the collar 68 and contact levers 54. Collar 68 is threaded onto sleeve 74. Elements 68, 72 and 74 slide together axially and form the release lever spider of the clutch. Collar 68 is axially adjustable on sleeve 74 by way of their interlocking threads but are normally rigidly locked together by jam nut 76. The release lever spider rotates with housing 12 and flywheel 20 and relative to driven shaft 26 when the clutch is disengaged; it is thus necessary that sleeve 74 have an internal bushing surface 78. Oil seal 80 permits the release lever spider to move axially relative to sleeve 66 when actuated by pull mechanism 16 without loss of oil.

The outer wall portion of housing 12 is formed with three equally spaced relatively small vent apertures 82, and the inner wall 70 is provided with similar apertures 84. These vent apertures provide for air flow into and out of the clutch due to temperature changes within the clutch; the apertures prevent the buildup of pressure within the clutch and lessen the likelihood of the escape of oil past seal 80 on increase of temperature within the clutch. The radial spacing of the vent apertures 82 and 84 essentially prevents the escape of oil through the vent apertures.

As noted above, the inner ends of the levers 54 are received in the stampings 72 of the pull mechanism, generally indicated at 16, mounted to slide axially on the driven shaft 26. The pull mechanism 16 comprises a release lever spider described above which includes inner bushing faced sleeve 74. Bearing 86 is mounted at the opposite end of the sleeve 74, and carries a throwout housing member 88 which is connected through pull or release mechanism 16 to the clutch pedal (not shown) of the vehicle. Mounted on the sleeve 74 between jam nut 76 and throwout housing 88 is a spanner nut 90 welded to sleeve 74 for rotating sleeve 74 with respect to collar 68 for relative adjustment therebetween.

Driven shaft 26 contains two axial grooves 94 disposed 180 degrees from each other. Annular ring seal 91 is provided with two internally projecting tongues 92 which fit into grooves 94 of shaft 26. Ring seal 91 circumferentially projects outwardly into groove 96 of sleeve 74. Seal ring 91 is formed of a heat stable bushing material such as polytetrafluoroethylene and serves as both an oil seal and a bushing. The grooves 94 and 96 locking ring seal 91 cause the ring seal 91 to rotate with driven shaft 26 and also cause the ring seal to axially slide with sleeve 74. Therefore when the clutch is disengaged, ring seal rotates relative to sleeve 74 and with driven shaft 26, but when the clutch is engaged ring seal 91 rotates with driven shaft 26 and with sleeve 74.

Keyed to the transmission or output end of the driven shaft 26, as at 98, is an inertia brake member 18 which is free to move axially on the shaft between surface 89 of the throwout housing member 88 and wall 100 of the front bearing cap associated with the fixed transmission housing 24. Brake 18 is keyed at 98 within slot 94. Brake 18 comprises friction surfaces 102 which are adapted to frictionally engage wall 100 of housing 24 and wall 89 of throw-out yoke 88.

When the throwout housing member 88 is caused to move axially rearwardly toward the wall 100 by means of the clutch pedal linkage, the levers 54, carried in the U-shaped stampings 72 of the pull mechanism through their pivotal connections to the pressure plate 58, will cause the driving connection between the driving member 20 and the driven shaft 26 through the friction discs 30 to be disengaged. In order that the operator of the vehicle may quickly and easily shift the vehicle into another lower gear or into first gear initially, it is necessary that the inertia in the driven member and fluid drag caused by the fluid coupling, be braked when desired. This is effected by the movement of the throwout housing member 88 axially toward the inertia brake 18. This movement causes the wall 89 to engage the outer friction face 102 of the inertia brake, moving it rearwardly into engagement with the face 100 of the fixed housing 24. Since the inertia brake is slidingly keyed to the driven shaft, this will cause the braking of the driven shaft 26, thus enabling the vehicle operator to quickly shift the gears in the vehicle.

It will be seen that the compression springs 14, acting through the pressure plate 58, normally effect a driving engagement between the driving member 20 and the driven shaft 26 by means of the friction discs, the driving plate and the pressure plate. Over periods of long-continued use, this will cause wear to take place on friction material 62 carried by the friction discs 30. The compression springs automatically compensate for this wear since they normally urge the pressure plate to move axially along the driven shaft forcing the friction discs into engagement with the driving plate and the driving member. This wear on the friction material 62 is immensely reduced by the oil carried within the housing 12 so that the material 62 may last the life of the vehicle. The structure disclosed is of normal clutch size and may be used as a replacement unit and yet the unit contains an oil tight compartment which functions to retain the oil within the clutch with substantially no leakage or escape of oil over long periods of service. The oil tight housing 12 is provided with a plug 104 to permit filling and drainage of the oil from within the clutch structure if desired.

In spite of the fact that the oil reduces the wear on the friction material 62 to a minimum, nevertheless some wear is unavoidable. This wear is accentuated through the levers 54 so that a small axial movement of the friction discs toward the guiding member causes a pronounced movement of the yoke member 88 away from the inertia brake 18. This is undesirable since the distance between the yoke member and the inertia brake should be kept as nearly uniform as possible in order that the inertia of the driven shaft may be braked quickly when the vehicle is in operation to shift gears and in order that the vehicle operator may have a more exact control over the vehicle. To compensate for this axial movement of the throwout housing 88 from the inertia brake, the nut 76 need merely to be loosened and nut 90, which is welded to sleeve 74, then rotated to turn sleeve 74 to move it axially rearwardly relative to collar 68 and stamping 72 thus effecting a movement of housing member 88 toward braking surfaces and allowing the distance between the housing member 88 and the inertia brake members 18 to be adjusted. The normal transmission housing 24 which encloses the clutch is provided with an access opening 106 to allow such rotation of the nuts 76 and 90 and consequent adjustment of the brake 18 if and when required. If braking action is not utilized no brake adjustment is necessary and clutch will perform normally.

It will be obvious to those skilled in the art that various changes may be made without departing from the scope of the invention and therefore the invention is not intended to be limited to what is shown in the appended claims.

What is claimed is:

1. A heavy duty friction clutch assembly comprising:
   a driving member;
   a driven shaft;
   means for normally effecting a driving connection between said driving member and said driven shaft;
   means for disengaging said driving connection;
   a pull-mechanism means for moving said disengaging means comprising a release lever spider slidably mounted on said driven shaft and operable upon axial movement away from said driving member to activate said disengaging means, said release lever spider comprising an annular sleeve having an inner bushing surface contacting said driven shaft, said pull mechanism further comprising a throw-out member fixed to the end of said release lever spider;
   inertia brake means operative between a fixed member and said throw-out member and engaged by effecting movement of said pull-mechanism means beyond that distance required to activate said disengaging means;

a first housing member fixedly secured in oil tight relation about said driving connection and maintaining a pool of cooling liquid therein, said first housing comprising an annular oil seal in slidable contacting relation with the outer surface of said release lever spider;

a bushing and sealing ring seal having its outer surface contacting an inner surface of said annular sleeve and having its inner surface contacting the outer surface of said driven shaft, said ring seal being adapted to rotate with said driven shaft and further being adapted to slide with said release lever spider; and a second housing about said heavy-duty friction clutch assembly.

2. A heavy-duty friction clutch assembly in accordance with claim 1 wherein said release lever spider further comprises an annular collar about said annular sleeve, said annular collar being associated with said disengaging means, and the outer surface of said annular collar being in the said slidable relation of said release lever spider with said annular oil seal.

3. A heavy duty friction clutch in accordance with claim 1 wherein said first housing comprises inner and outer walls adjacent said annular oil seal, said inner and outer walls containing vent holes.

4. A heavy-duty friction clutch in accordance with claim 2 wherein said pull mechanism means comprises screw threads between the outer surface of said sleeve and the inner surface of said collar and means mounted on said sleeve for moving said sleeve axially relative to said throw-out member whereby after said driving connection has worn and the normal position of said throw-out member has shifted axially, said member may be adjusted to insure full engagement of said inertia brake means.

References Cited by the Examiner
UNITED STATES PATENTS

| 1,444,782 | 2/23 | Dooley | 192—13 |
| 1,500,971 | 7/24 | Wallace. | |
| 2,671,543 | 3/54 | Bosch | 192—13 |
| 2,796,964 | 6/57 | Root. | |
| 3,080,773 | 3/63 | Lee et al. | 74—364 |

DAVID J. WILLIAMOWSKY, *Primary Examiner.*